US008799628B2

(12) United States Patent
Kaplan et al.

(10) Patent No.: US 8,799,628 B2
(45) Date of Patent: Aug. 5, 2014

(54) EARLY BRANCH DETERMINATION

(75) Inventors: David A. Kaplan, Austin, TX (US);
Daniel B. Hopper, Austin, TX (US);
Benjamin C. Serebrin, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 968 days.

(21) Appl. No.: 12/551,240

(22) Filed: Aug. 31, 2009

(65) Prior Publication Data

US 2011/0055523 A1 Mar. 3, 2011

(51) Int. Cl.
*G06F 9/30* (2006.01)
(52) U.S. Cl.
CPC .................................. *G06F 9/30058* (2013.01)
USPC ......................................................... 712/234
(58) Field of Classification Search
CPC ................................................... G06F 9/30058
USPC .......................................... 712/214, 216, 234
See application file for complete search history.

(56) References Cited

U.S. PATENT DOCUMENTS

| 6,611,910 | B2 | 8/2003 | Sharangpani et al. |
| 6,978,361 | B2 | 12/2005 | Luick |
| 7,409,535 | B2 | 8/2008 | Park et al. |
| 8,069,339 | B2 * | 11/2011 | Henry et al. .................. 712/235 |
| 2010/0205407 | A1 * | 8/2010 | Henry et al. .................. 712/216 |
| 2010/0205415 | A1 * | 8/2010 | Henry et al. .................. 712/234 |

* cited by examiner

*Primary Examiner* — Robert Fennema
*Assistant Examiner* — Benjamin Geib
(74) *Attorney, Agent, or Firm* — Meyertons Hood Kivlin Kowert & Goetzel; Erik A. Heter

(57) ABSTRACT

A method and apparatus for branch determination is disclosed. The method includes a first command issuing within a computer processor. Execution of the first command by the computer processor includes evaluating one or more conditions to set one or more flags. Subsequent to the first command issuing, a second command is issued and executed. Execution of the second command includes causing the computer processor to wait until the one or more flags are set. Subsequent to the first and second commands issuing, a third command is issued and executed. Execution of the third command includes performing a jump operation based on a value of at least one of the one or more flags set by the first command.

20 Claims, 8 Drawing Sheets

EARLY BRANCH DETERMINATION

BACKGROUND OF THE INVENTION

1. Field of the Invention

This invention relates to processors for computer systems, and more particularly, to the processing of branch instructions in processors.

2. Description of the Related Art

Modern processors for computer systems and other devices use a number of different techniques to increase the throughput of executed instructions, and thus achieve higher performance. Pipelining is one such technique, wherein multiple instructions may each be at different stages of execution (i.e. in different stages of a pipeline) in a given instance. Typical pipeline stages may include a number of stages, each of which performs a function of the pipeline, such as fetching instructions, decoding instructions, fetching operands, executing instructions, and writing results of the executed instructions to memory (e.g., to registers).

Additional techniques may be employed in order to keep the pipeline full and to prevent stalls. Two related techniques that may be utilized are branch prediction and speculative execution. Branch prediction may be used to predict the results of an upcoming branch instruction in an instruction stream. A branch instruction is an instruction that may alter the flow of instructions based on a certain condition. If the condition is true, the instruction flow may be altered (i.e. the branch is taken), whereas a next instruction in the sequence may be executed if the condition is false (i.e. the branch is not taken). A branch prediction unit may be utilized in a processor in order to predict whether or not branches in upcoming branch instructions are taken or not taken.

In conjunction with branch prediction, speculative execution may also be utilized. Based on the result of the prediction by a branch prediction unit, instructions following the branch instruction may be executed. For example, if a branch prediction unit predicts that a branch will be taken, instructions corresponding to the taken branch may be speculatively executed. If the branch was correctly predicted, the results of the speculatively executed instructions may be committed to registers, with those instructions being subsequently retired. Thus, correctly predicting the results of branch instructions may prevent stalls in the pipeline while awaiting evaluation of the condition upon which the direction of the branch is based.

In the event that a branch prediction is incorrect (i.e. mispredicted), the results of instructions that were speculatively executed based on the mispredicted branch may be discarded. The instructions corresponding to the other direction of the branch (i.e. those instructions that would have been executed had the branch been correctly predicted) may be dispatched and subsequently executed. A misprediction may result in a stall in the pipeline, and thus a performance penalty. In many cases however, this performance penalty may be acceptable if the ratio of correctly predicted branches to mispredicted branches is of a sufficiently high value.

SUMMARY OF THE DISCLOSURE

Various embodiments of a method and apparatus for early branch determination are disclosed. In one embodiment, an apparatus for early branch determination includes a storage element configured to store one or more flag values and an execution pipeline, wherein the execution pipeline includes a dispatch unit and an execute unit. The execution pipeline may be configured to execute a first command that causes the execute unit to evaluate one or more conditions to set the one or more flag values. The execution pipeline may further be configured to execute a second command that causes the dispatch unit to cease dispatching instructions to a subsequent unit in the execution pipeline until the one or more flag values are set.

In one embodiment, a method for branch determination includes a first command issuing within a computer processor, wherein execution of the first command by the computer processor includes evaluating one or more conditions to set one or more flags. The method may further include a second command issuing, subsequent to the first command issuing, within the computer processor, wherein execution of the second command by the computer processor includes causing the computer processor to stall until the one or more flags are set. Subsequent to the first and second commands issuing, the method may further include a third command issuing within the computer processor, wherein execution of the third command by the computer processor includes performing a jump operation based on a value of at least one of the one or more flags set by the first command.

A computer readable medium storing instructions including a first command, a second command is also contemplated. The first command that causes the execute unit to evaluate one or more conditions to set the one or more flag values, while execution of the second command that causes the dispatch unit to cease dispatching instructions to a subsequent unit in the execution pipeline until the one or more flag values are set. A third command may also be stored on the computer readable medium, wherein the third command may cause a branch condition to be evaluated, and may further cause a branch operation to be performed if the branch condition is evaluated as true.

BRIEF DESCRIPTION OF THE DRAWINGS

Other aspects of the disclosure will become apparent upon reading the following detailed description and upon reference to the accompanying drawings in which.

Figure 1:
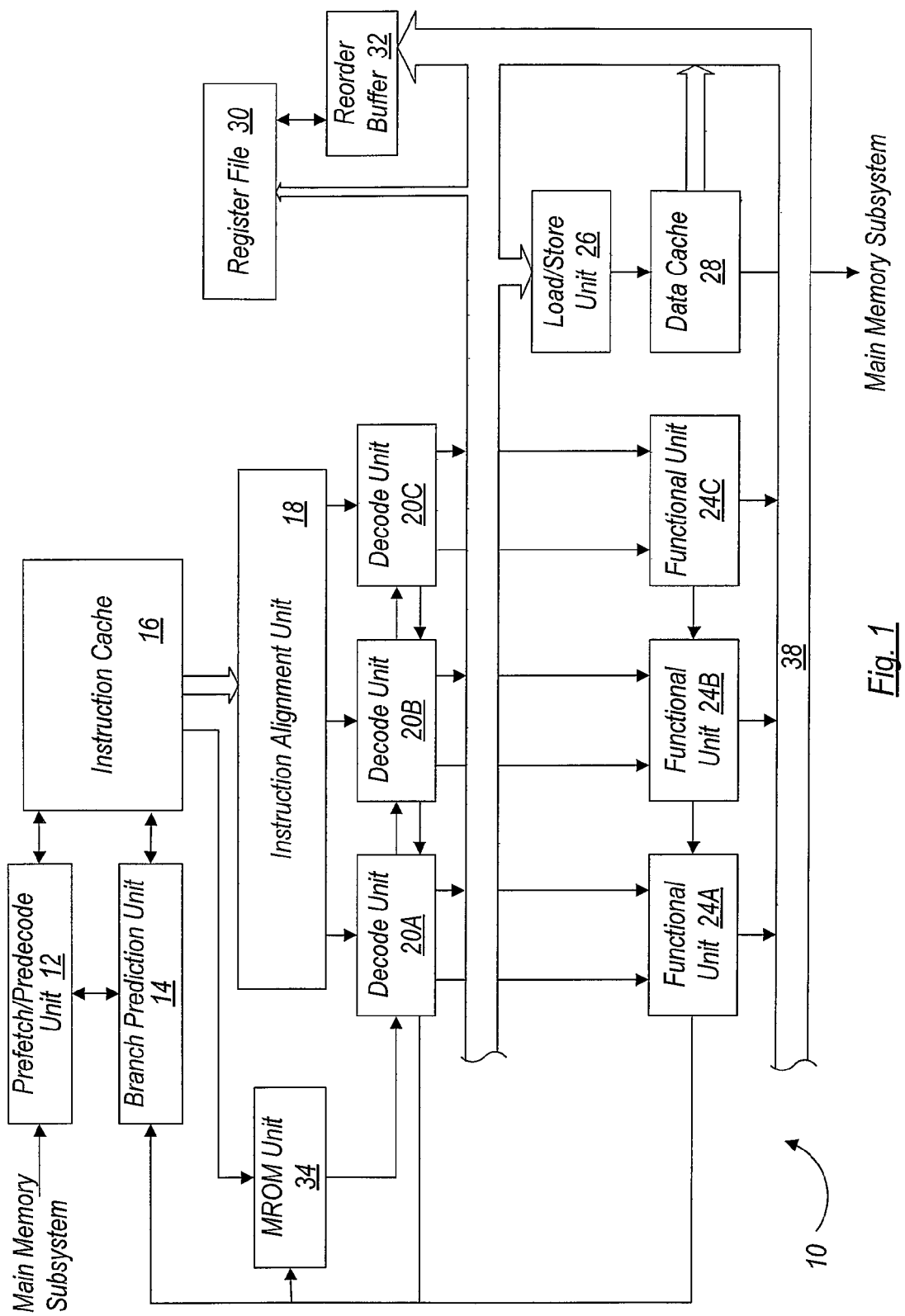
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION

Processor Overview

Turning now to FIG. 1, a block diagram of one embodiment of a processor 10 is shown. In the illustrated embodiment, the processor 10 includes a prefetch/predecode unit 12, a branch prediction unit 14, an instruction cache 16, an instruction alignment unit 18, a plurality of decode units 20A-20C, a plurality of functional units 24A-24C, a load/store unit 26, a data cache 28, a register file 30, a reorder buffer 32, and an MROM (microcode read only memory) unit 34. Blocks referred to herein with a reference number followed by a letter will be collectively referred to by the reference number alone. For example, decode units 20A-20C will be collectively referred to as decode units 20.

The prefetch/predecode unit 12 is coupled to receive instructions from a main memory subsystem (not shown), and is further coupled to the instruction cache 16 and the branch prediction unit 14. Similarly, the branch prediction unit 14 is coupled to the instruction cache 16. Still further, the branch prediction unit 14 is coupled to the decode units 20 and the functional units 24. The instruction cache 16 is further coupled to the MROM unit 34 and the instruction alignment unit 18. The instruction alignment unit 18 is in turn coupled to the decode units 20. Each decode unit 20A-20C is coupled to the load/store unit 26 and to respective functional units 24A-24C. Additionally, the decode units 20 are coupled to the register file 30 and the reorder buffer 32. The functional units 24 are coupled to the load/store unit 26, the register file 30, and the reorder buffer 32 as well. The data cache 28 is coupled to the load/store unit 26 and to the main memory subsystem. Finally, the MROM unit 34 is coupled to the decode units 20 and at least one of the functional units 24.

Generally speaking, the MROM unit 34 decodes MROM instructions and dispatches a plurality of microcode operations into the instruction processing pipeline. The plurality of microcode operations, when executed, effectuate the architecturally defined function(s) of the MROM instruction. The microcode operations may include ISA level instructions, and may also include specially designed operations that may be used by the microcode routines but that are not part of the ISA (instruction set architecture) implemented by the processor 10. In general, a microcode operation may be any operation that a functional unit is configured to execute. The microcode operations, collectively, may be referred to as a microcode routine or microcode sequence. Some microcode routines may contain microcode loops that repetitively execute the same operations for a specified number of iterations. The number of iterations may be specified by a loop counter value.

The instruction cache 16 is a high speed cache memory provided to store instructions. Instructions are fetched from the instruction cache 16 and dispatched to the decode units 20. It is noted that instruction cache 16 may be implemented as a fully associative, set associative, or direct mapped configuration in various embodiments.

Instructions are fetched from main memory and stored into the instruction cache 16 by the prefetch/predecode unit 12. Instructions may be prefetched prior to the instruction cache 16 recording a miss for the instructions in accordance with a prefetch scheme. A variety of prefetch schemes may be employed by the prefetch/predecode unit 12. As the prefetch/predecode unit 12 transfers instructions from main memory to instruction cache 16, prefetch/predecode unit 12 may generate predecode data identifying instructions in the instructions bytes. In one embodiment, three predecode bits for each instruction byte may be generated: a start bit, an end bit, and a functional bit. The predecode bits form tags indicative of the boundaries of each instruction. The predecode tags may also convey additional information such as whether a given instruction is directly-decoded or MROM. Still further, the prefetch/predecode unit 12 may be configured to detect branch instructions and to store branch prediction information corresponding to the branch instructions into the branch prediction unit 14.

The processor 10 employs branch prediction in order to speculatively fetch instructions subsequent to conditional branch instructions. The branch prediction unit 14 is included to perform branch prediction operations. In one embodiment, up to two branch target addresses are stored with respect to each cache line in the instruction cache 16. The prefetch/predecode unit 12 determines initial branch targets when a particular line is predecoded. Subsequent updates to the branch targets corresponding to a cache line may occur due to the execution of instructions within the cache line. The instruction cache 16 provides an indication of the instruction address being fetched, so that the branch prediction unit 14 may determine which branch target addresses to select for forming a branch prediction. The decode units 20 and the functional units 24 provide update information to the branch prediction unit 14. A variety of suitable branch prediction algorithms may be employed by branch prediction unit 14. In addition to employing branch prediction, various embodiments of processor 10 may also employ branch determination for some branch instructions wherein one or more conditions of the branch are known early. Such embodiments will be discussed in further detail below with reference to FIGS. 2-5.

Instructions fetched from the instruction cache 16 are conveyed to the instruction alignment unit 18. As instructions are fetched from instruction cache 16, the corresponding predecode data is scanned to provide information to the instruction alignment unit 18 (and to the MROM unit 34) regarding the instructions being fetched. The instruction alignment unit 18 utilizes the scanning data to align an instruction to each of decode units 20. In one embodiment, the instruction alignment unit 18 aligns instructions from three sets of eight instruction bytes to the decode units 20. The decode unit 20A receives an instruction which is prior to instructions concurrently received by the decode units 20B and 20C (in program order). Similarly, the decode unit 20B receives an instruction which is prior to the instruction concurrently received by the decode unit 20C in program order. As used herein, the term "program order" refers to the order of the instruction as coded in the original sequence in memory (including any branches as predicted by the branch prediction unit 14). Additionally, the term "issue" or the term "dispatch" may be used to refer to conveyance of an operation that is to be executed from one unit to another.

In one embodiment, the instruction alignment unit 18 includes an instruction queue configured to store instruction bytes. An instruction scanning unit within the instruction cache 16 may separate the fetched instructions into instruction blocks, and may identify up to a predefined maximum number of instructions within each instruction block. Instruction identification information for each of the identified instructions is conveyed to the instruction alignment unit 18 and is stored in the instruction queue. In one embodiment, the predefined number of instruction bytes comprises eight instruction bytes stored in contiguous main memory storage locations. The eight instruction bytes are aligned to an eight byte boundary (i.e. the least significant three bits of the address of the first of the contiguous bytes are zero).

The decode units 20 are configured to decode instructions received from the instruction alignment unit 18. Register operand information may be detected and routed to the register file 30 and the reorder buffer 32. Additionally, if the instructions require one or more memory operations to be performed, the decode units 20 may dispatch the memory operations to the load/store unit 26. Each instruction is decoded into decoded instructions for the functional units 24, and these decoded instructions may be dispatched to one of the functional units 24 along with operand address information and displacement or immediate data which may be included with the instruction.

The processor 10 supports out of order execution, and thus employs the reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to the register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that, in other embodiments, register renaming across a larger set of physical registers (with a map of logical registers to physical registers) may be used instead of a reorder buffer.

The register file 30 may comprises storage locations for each of the registers specified by the ISA implemented by the processor 10. Additional storage locations may also be included within the register file 30 for use by the MROM unit 34. The reorder buffer 32 contains temporary storage locations for results which change the contents of these registers to thereby allow out of order execution. A temporary storage location of the reorder buffer 32 is reserved for each instruction which, upon decode, is determined to modify the contents of one of the registers. Therefore, at various points during execution of a particular program, the reorder buffer 32 may have one or more locations which contain the speculatively executed contents of a given register. In one particular embodiment, the reorder buffer 32 is configured to store and manipulate concurrently decoded instructions as a unit. This configuration will be referred to herein as "line-oriented".

In one embodiment, each of the functional units 24 is configured to perform integer arithmetic operations of addition and subtraction, as well as shifts, rotates, logical operations, and branch operations. It is noted that a floating point unit (not shown) may also be employed to accommodate floating point operations. The floating point unit may be operated similar to load/store unit 26 in that any of the decode units 20 may dispatch instructions to the floating point unit. Additionally, the functional units 24 may be configured to perform address generation for load and store memory operations performed by the load/store unit 26.

Results produced by the functional units 24 are sent to the reorder buffer 32 if a register value is being updated, and to the load/store unit 26 if the contents of a memory location are changed. If the result is to be stored in a register, the reorder buffer 32 stores the result in the location reserved for the value of the register when the instruction was decoded. A plurality of result buses 38 are included for forwarding of results from the functional units 24 and the load/store unit 26. The result buses 38 convey the result generated, as well as the reorder buffer tag identifying the instruction being executed.

The load/store unit 26 provides an interface between the functional units 24 and the data cache 28. In one embodiment, the load/store unit 26 is configured with a load/store buffer (or buffers). The decode units 20 arbitrate for access to the load/store unit 26. The load/store unit 26 also performs dependency checking for load memory operations against pending store memory operations to ensure that data coherency is maintained. Additionally, the load/store unit 26 may include a special register storage for special registers such as the segment registers and other registers related to the address translation mechanism defined by the x86 processor architecture.

The data cache 28 is a high speed cache memory provided to temporarily store data being transferred between the load/store unit 26 and the main memory subsystem. Similar to the instruction cache 16, the data cache 28 may be implemented in a variety of specific memory configurations, including a set associative configuration, direct mapped configuration, etc. It should be noted that FIG. 1 is intended to illustrate an exemplary processor, and the logical units and techniques disclosed herein may be utilized in other processors.

Microcode Pipeline

Figure 2:
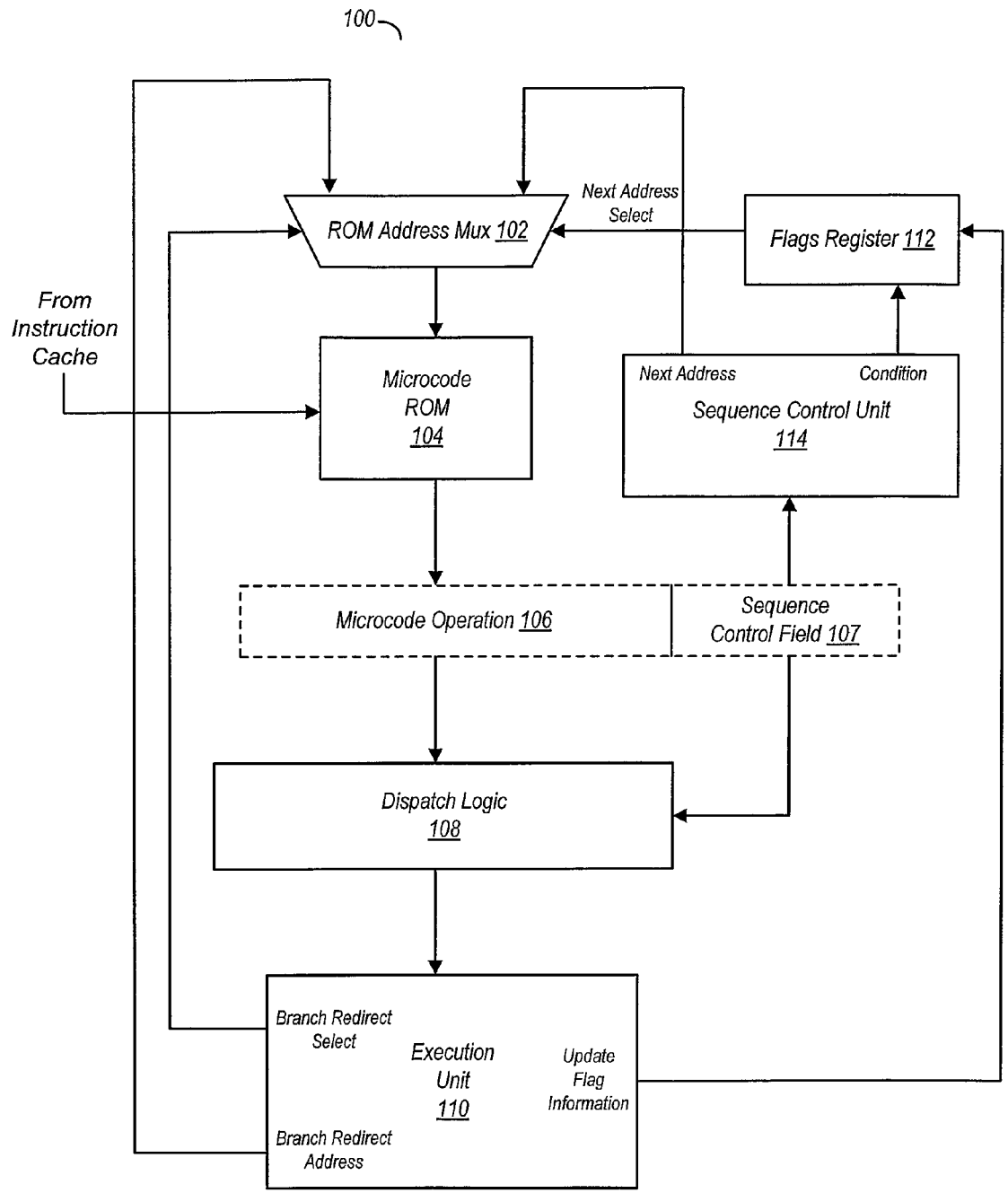
FIG. 2 is a block diagram of one embodiment of a processor pipeline configured for processing microcode instructions.

FIG. 2 is a block diagram of one embodiment of a processor pipeline configured for processing microcode instructions. In the embodiment shown, processor pipeline 100 includes a ROM (read only memory) address multiplexer 102, microcode ROM 104, dispatch logic 108, execution unit 110, flags register 112, and sequence control unit 114. In some embodiments, various ones of the functional blocks shown herein may be analogous to, or part of, other functional blocks shown in FIG. 1. For example, ROM address multiplexer 102, microcode ROM 104, sequence control unit 114, and flags register 112 may be, in one embodiment, part of MROM unit 34 of FIG. 1. Similarly, dispatch logic 108 may be analogous to or part of a decode unit 20, while execution unit 110 may be analogous to a functional unit 24. However, it is noted that pipeline 100 may be part of an embodiment of a processor other than that shown in FIG. 1.

It is noted that other types of pipelines capable of performing the various operations described herein are also possible and contemplated. Generally speaking, a processor pipeline in accordance with the disclosure may include two or more units, wherein two or more instructions may concurrently be in various stage of execution. For example, in the pipeline shown in FIG. 2, a first instruction may be selected in microcode ROM 104, a second instruction may be awaiting dispatch in dispatch logic 108, while a third instruction is executing in execution unit 110, with each of these operations being performed concurrently.

In the embodiment shown, microcode ROM 104 is configured to store microcode instructions that may be used to implement a microcode sequence (or microcode routine), as well as information indicating particular microcode instructions that are a part of a given microcode routine. In some embodiments of a processor in which pipeline 100 may be implemented, certain instructions of the ISA may require the use of a microcode routine to complete execution. In the embodiment shown, instructions that invoke the execution of a microcode routine may be received from an instruction cache, such as instruction cache 16 of FIG. 1. Such microcode routines may be implemented using one or more microcode instructions, or operations. In the example shown, microcode operation 106 is one such microcode instruction that may be provided by microcode ROM 104 to dispatch logic 108. In this particular embodiment, each microcode operation 106 may be associated with a sequence control field 107, which certain types of information pertaining to the microcode routine may be included. Such information may include an address of a next instruction to be executed. For instructions that include a conditional branch, sequence control field 107 may include multiple addresses, e.g., one address corresponding to a next instruction if the branch is taken, and another address corresponding to a next instruction if the branch is not taken. Commands may also be included in sequence control field 107, as will be explained in further detail below.

In addition to being configured to store microcode instructions, microcode ROM 104 may also include additional logic used for decoding instruction addresses received from ROM address multiplexer 102. Microcode ROM 104 may also include logic that causes a microcode routine to be invoked responsive to receiving an indication from an instruction cache such as instruction cache 16 of FIG. 1. Logic for determining when specific microcode instructions are to be issued to dispatch logic 108 may also be included in microcode ROM 104.

Dispatch logic 108 may be coupled to receive microcode instructions from microcode ROM 108. Received microcode instructions may be forwarded by dispatch logic 108 to execution unit 110 at an appropriate time. In some cases, dispatch logic 108 may temporarily halt the dispatching of instructions to execution unit 110, e.g., when the execution of one or more previously dispatched instructions (in flight between dispatch and execution) have not yet completed. Dispatch logic 108 may also refrain from dispatching instructions to execution unit 110 based on information contained within the sequence control field 107 associated with a received microcode operation 106. In some embodiments, dispatch logic 108 may also perform decoding of microcode instructions received from microcode ROM 104.

Execution unit 110 is coupled to receive microcode instructions from dispatch logic 108, and is configured to execute these instructions. The execution of microcode instructions may include generation of additional information that may be fed back to another portion of pipeline 100. For example, execution of certain instructions may provide an indication to flags register 112 to update one or more flags in the embodiment shown. In some cases, execution unit 110 may also execute branch instructions wherein no prior prediction or determination of the branch direction has been made. Responsive to execution of such branch instructions, a branch redirect address may be provided from execution unit 110 to ROM address multiplexer 102 in order to indicate the address in microcode ROM 104 of an instruction that is to be executed responsive to taking the branch. Execution unit 110 may also provide a branch redirect selection signal to ROM address multiplexer 102 in order to enable the branch redirect address to be selected and provided to microcode ROM 104.

Sequence control unit 114 may be configured to perform various functions for controlling a microcode sequence. In the embodiment shown, sequence control unit 114 may be configured to provide a next instruction address to ROM address multiplexer 102. Sequence control unit 114 may also communicate with flags register 112 in order to determine the state of certain flags that may be associated with an instruction whose next address is to be provided by sequence control unit 114. Based on the determination of the states of certain flags, a next address select signal may be asserted by flags register 112. The next address select signal, when asserted, may cause ROM address multiplexer 102 to select the next address provided from sequence control unit 114.

Various types of flag information may be stored in flags register 112. Flag information stored in flags register 112 may indicate various operations to be performed, such as operations associated with a jump from a branch instruction, a register shift, a loop count, indications to increment a register or decrement a register, and so forth. Accordingly, sequence control unit 114, operating in conjunction with flags register 112, may control the sequence of instructions executed in pipeline 100.

In the embodiment shown, pipeline 100 may be configured to perform early branch determination for branch instructions having conditions that are known early and upon which a branch may or may not be taken. Accordingly, microcode ROM may store additional commands that allow such conditions to be evaluated in order to determine the direction of the branch. Based on the evaluation of these conditions, one or more flags stored in flag register 112 may be set to certain values indicating whether or not the branch is to be taken or not taken (additional information may also be provided, which will be discussed below). Thus, since the branch direction may be determined prior to the instruction being executed, sequence control unit 114 may provide the address of the next instruction regardless of whether or not the branch is taken.

For branch instructions in which early branch determination may be performed, branch prediction and speculative execution may be eliminated. Mispredicted branches may incur a performance penalty, as a pipeline in which the misprediction occurred may be stalled in order to discard at least some of the instructions that were issued subsequent to the mispredicted branch. Furthermore, the results of speculatively executed instructions may also be discarded from a register file (e.g., register file 30 of FIG. 1). Some instructions that are speculatively executed as a result of a mispredicted branch may cause unrecoverable side effects, which may in turn cause the microcode routine to be aborted, and may even cause the processor to halt execution of instructions. If instructions following a branch are not speculatively executed, a processor pipeline may stall in order to wait for execution of the branch instruction before additional instructions are provided (e.g., to dispatch logic 108), thereby resulting in another type of performance penalty. Thus, the early determination of branches for certain branch instructions and the avoidance of speculative execution may eliminate or minimize the performance penalties that may result from branches that are mispredicted or not determined until execution time, and may also avoid the side effects that may result from speculative execution.

In the embodiment shown, three different commands may be provided in order to perform early branch determination for microcode routines. These commands will be referred to herein as the set_flag command, the wait_for_flag command, and the jump_if_flag command. It is noted however that this nomenclature is not intended to be limiting. The specific nomenclature for the commands to be described herein may vary from one embodiment to the next.

In the embodiment shown, when an instruction to be executed invokes a microcode routine, the set_flag command may be executed. The set_flag command, when executed, may evaluate one or more conditions for one or more branch instructions in the microcode routine. The evaluated conditions may include conditions that determine whether or not one or more branches are to be taken, and may also include conditions indicating a number of times a particular operation is to be performed (e.g., the number of iterations of a loop that includes the branch instruction). Responsive to completing the evaluation, execution of the set_flag command may cause the state of one or more flags to be updated. The updated flags may indicate the results of an evaluated condition.

The wait_for_flag command, when executed, may cause the dispatching of other microcode instructions to be temporarily halted until the set_flag command has completed execution. However, execution of the wait_for_flag may allow for instructions to propagate through other portions of the pipeline (e.g., from microcode ROM 104 into dispatch logic 108). The execution of instructions issued between issuance of the set_flag command and wait_for_flag command may also be supported in some embodiments in order to reduce pipeline stalls.

The jump_if_flag command, when executed, may cause a jump resulting from a branch instruction if a corresponding flag indicates the branch is to be taken. Otherwise, the jump_if_flag command may cause the branch not to be taken, and may also cause execution of the microcode routine to continue with the instruction immediately following the branch instruction when the branch is not taken. Some branch instructions, when executed in conjunction with the jump_if_flag command, may perform additional functions based on flags stored flags register 112, such as incrementing a register (i.e. incrementing the value stored in the register), decrementing a register, shifting the register, and so forth.

Generally speaking, use of the set_flag and wait_for_flag commands may enable early determination of conditions that are used to determine whether a branch is taken resulting from the execution of a subsequently issued branch instruction. The jump_if_flag command may enable the next instruction address to be provided from sequence control unit 114 to ROM address multiplexer 102 depending on flag information stored in flags register 112. Accordingly, when an early determination of a branch condition is made, providing the address of the next instruction address may eliminate the need to assert the branch redirect select line and to provide the branch redirect address from execution unit 110 responsive to execution of a corresponding branch instruction. This may in turn may improve performance, as the execution of a branch instruction wherein a branch is taken need not clear the pipeline of subsequently issued instructions that would have otherwise been executed if the branch was not taken. Instead, even when a branch is taken in the current embodiment, instruction issuance and execution may continue with no clearing of the pipeline, since the use of the aforementioned commands will have previously evaluated the branch conditions and thus will have thus effectively determined the address of the next instruction to be executed following the branch instruction.

It should also be noted that, in some embodiments, commands may be merged. For example, an embodiment is possible and contemplated wherein the set_flag and wait_for_flag commands are merged into a single command that performs the functions of both as described herein.

Figure 3:
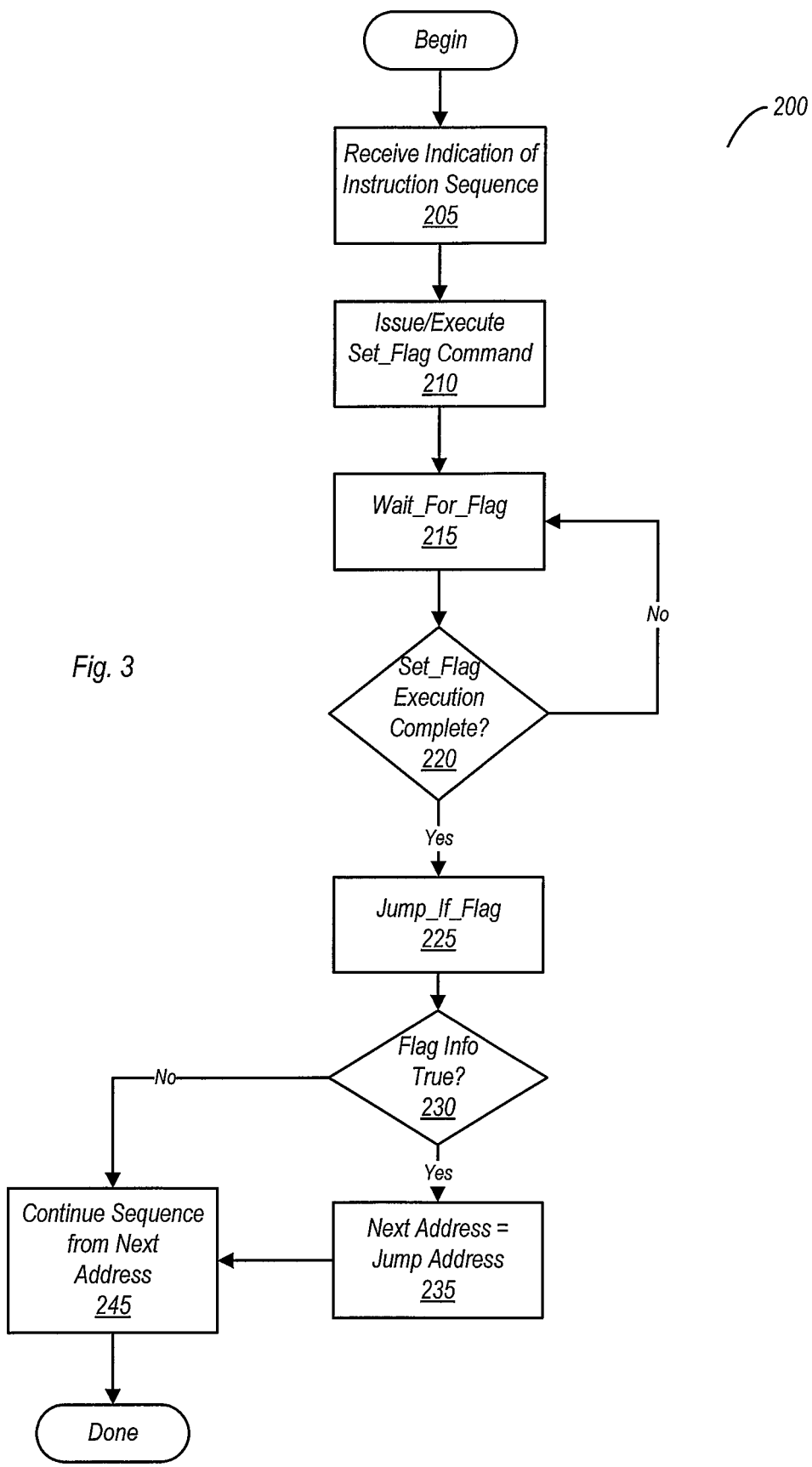
FIG. 3 is a flow diagram of one embodiment of a method of performing branch determination.

Method Flow:

FIG. 3 is a flow diagram of one embodiment of a method of performing branch determination. While references to the elements shown in FIG. 1 and FIG. 2 may be made during the explanation of method 200, it should be noted that the method is not limited to that particular configuration, and may thus be applied to other configurations as well. Furthermore, while FIG. 2 is applicable to microcode routines executed on one embodiment of a microcode pipeline, it should be noted that method 200 shown in FIG. 3 may also be applied to other routines (e.g., ISA-level routines) and pipelines in which such routines may be executed.

Method 200 begins with the receiving of an instruction sequence (block 205). Referring to FIG. 2, such an instruction sequence may be a microcode routine that is used to execute an ISA-level instruction. An instruction cache (e.g., instruction cache 16 of FIG. 1) may provide an indication to microcode ROM 104 that such an ISA-level instruction is to be executed, thereby invoking a microcode routine.

For the purposes of this explanation, it is assumed that the microcode routine to be executed includes one or more branch instructions. Accordingly, responsive to the invoking of a microcode routine having one or more branch instructions, the set_flag command may be issued and executed (block 210). Execution of the set_flag command may result in the evaluation of a branch condition for each of the one or more branch instructions that may be included in the microcode routine. For example, if the branch condition is based on a particular operating mode (e.g., branch taken if operating in a first mode, branch not taken if operating in a second mode), execution of the set_flag command may result in the determination of the mode in order to determine the branch condition.

Flags stored in a register (e.g., flags register 112) may be set responsive to execution of the set_flag command, wherein such flags may indicate the result of the evaluation of a branch condition. It should be noted that the use of the term "set" as used herein in relation to the flags is not intended to indicate that the flag values are set to one particular state or another. For example, a logic 1 may be used to indicate that that a branch is to be taken, while a logic 0 may be used to indicate that a branch is not taken. Thus, to "set" the flag value as used herein is intended to convey that the flag value was set to either a logic 1 or a logic 0 in accordance with the evaluation of the branch condition. Thus, as the term "set" is used herein, a flag value may be "set" to a logic 1 to indicate that a branch is to be taken, or may be "set" to a logic 0 to indicate that a branch is not taken. Additionally, a flag value may be considered to be "set" even if it does not change state, as long as the one or more conditions that affect the flag value are evaluated. The use of the term "set" as used herein may also apply to other flags that may be used to indicate other actions performed responsive to execution of an instruction.

If the microcode routine includes loops wherein a given branch instruction is to be executed a number of times, execution of the set_flag command may also determine the number of times the branch instruction is to be executed while evaluating the branch condition for each instance. Flags stored in a register (e.g., flags register 112) may be set responsive to execution of the set_flag instruction to indicate the condition for each instance of the branch instruction involved in the loop.

For example, if it is determined that the microcode includes a loop including 20 iterations of a particular branch instruction, execution of the set_flag command may also evaluate the branch condition for each of the 20 iterations. In another example, if a microcode routine includes four different branch instructions, execution of the set_flag command may result in the evaluation of the branch condition for each of the four branch instructions. If any (or all) of the branch instructions are to be executed multiple times, execution of the set_flag command may include evaluation of the branch condition for each instance.

The set_flag command may also, when executed, cause the setting of flags that result in additional actions being performed for corresponding instructions. For example, flags may be set that cause registers to be incremented, to be decremented, to be shifted, and so forth. Generally speaking, execution of the set_flag command may result in the evaluation of branch conditions and other conditions that may be associated with instructions in the instruction sequence, and may cause one or more flags to be set according to the results of the evaluation.

Execution of the set_flag command may in turn be followed the execution of another command, the wait_for_flag command (block 215). When executed, the wait_for_flag command may cause a temporary cessation of the dispatching of new instructions (e.g., by dispatch logic 108) until the set_flag command has completed execution (although it may not be necessary to wait until the set_flag command is retired). If the set_flag command has not completed execution (220, no), the dispatching of additional instructions may remain inhibited. This may allow for sufficient time for the completion of evaluation of the various conditions which are to be performed during execution of the set_flag command. Furthermore, utilization of the wait_for_flag command may allow the pertinent flags to be set to their required conditions prior to dispatch of any instruction that includes a branch or jump is dispatched. It should be noted that in processor embodiments where the concurrent execution of two or more instructions is supported, unrelated instructions (i.e. unrelated to the set_flag and wait_for_flag commands) dispatched subsequent to the set_flag command but prior to issuance of the wait_for_flag command may be allowed to execute. This may reduce the amount of time that the pipeline may stall as a result of the inhibiting of the dispatch of instructions. Once the set_flag command has completed execution (block 220, yes), instructions may again be dispatched.

Following execution of the set_flag and wait_for_flag commands, a jump_if_flag command may be executed (block 225). Execution of the jump_if_flag command may include testing of one or more flag values in order to determine whether or not a branch is to be taken responsive to execution of a branch instruction. For the purposes of this example, it is assumed that only a single flag is to be tested, although it is noted that embodiments are possible and contemplated wherein multiple flags may be tested for branch determination. The flag information may be tested by reading the corresponding flag from a flags register (e.g., flags register 112 of FIG. 2). If the flag information indicates that the branch condition is true (block 230, yes), then the address of the next instruction to be executed is the jump address (block 235). Accordingly, the next instruction executed in the sequence may be obtained from the jump address.

If the testing of the flag in conjunction with the jump_if_flag indicates that the branch condition is not true (block 230, no), the branch is not taken. The next instruction in the sequence (i.e. the next instruction to be executed in the case where the branch is not taken) may be obtained from the next instruction address (block 245). It should be noted that continuing the sequence from the next instruction address may include or lead to the execution of another jump instruction.

It should be noted that method 200 as shown herein is an example based on a routine having a single branch instruction that utilizes a single flag to indicate the branch condition. It will be apparent to one skilled in the art that numerous modifications of method 200 are possible. For example, method 200 may be modified for a routine in which a number of different branch instructions may be executed, where some branches may be taken while others are not taken. In embodiments wherein multiple branch instructions are present, some branch instructions may be associated with loops, whereas other branch instructions are not associated with loops. Generally speaking, method 200 may be modified in any manner that includes execution of the set_flag command (or an equivalent thereof, and the scope of the disclosure is intended to cover the same. Various embodiments may also include the wait_for_flag command, and the jump_if_flag command (or equivalents thereof).

Figure 4A:
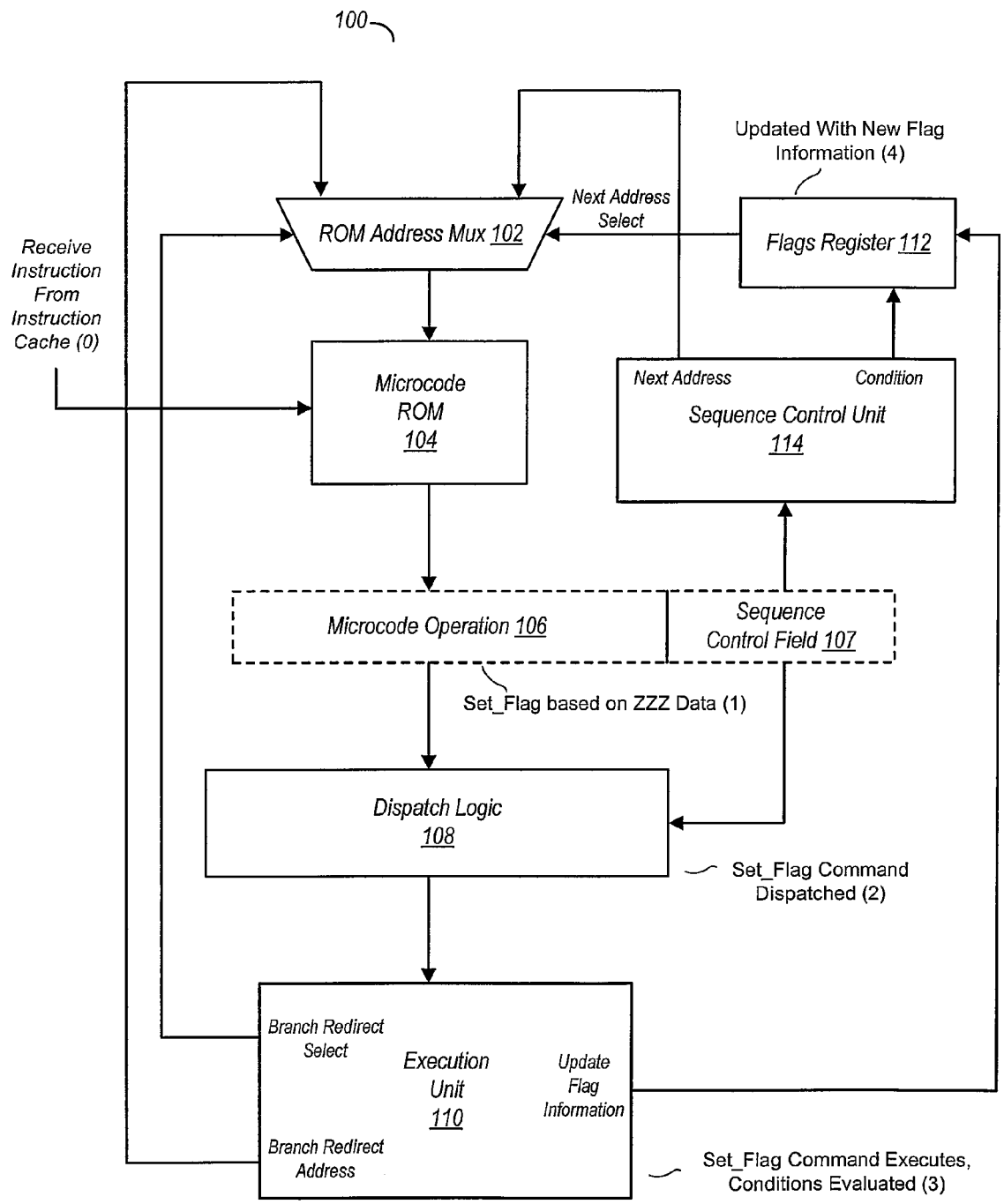
FIGS. 4A-4C are block diagrams illustrating one embodiment of a method for performing branch determination.
Figure 4B:
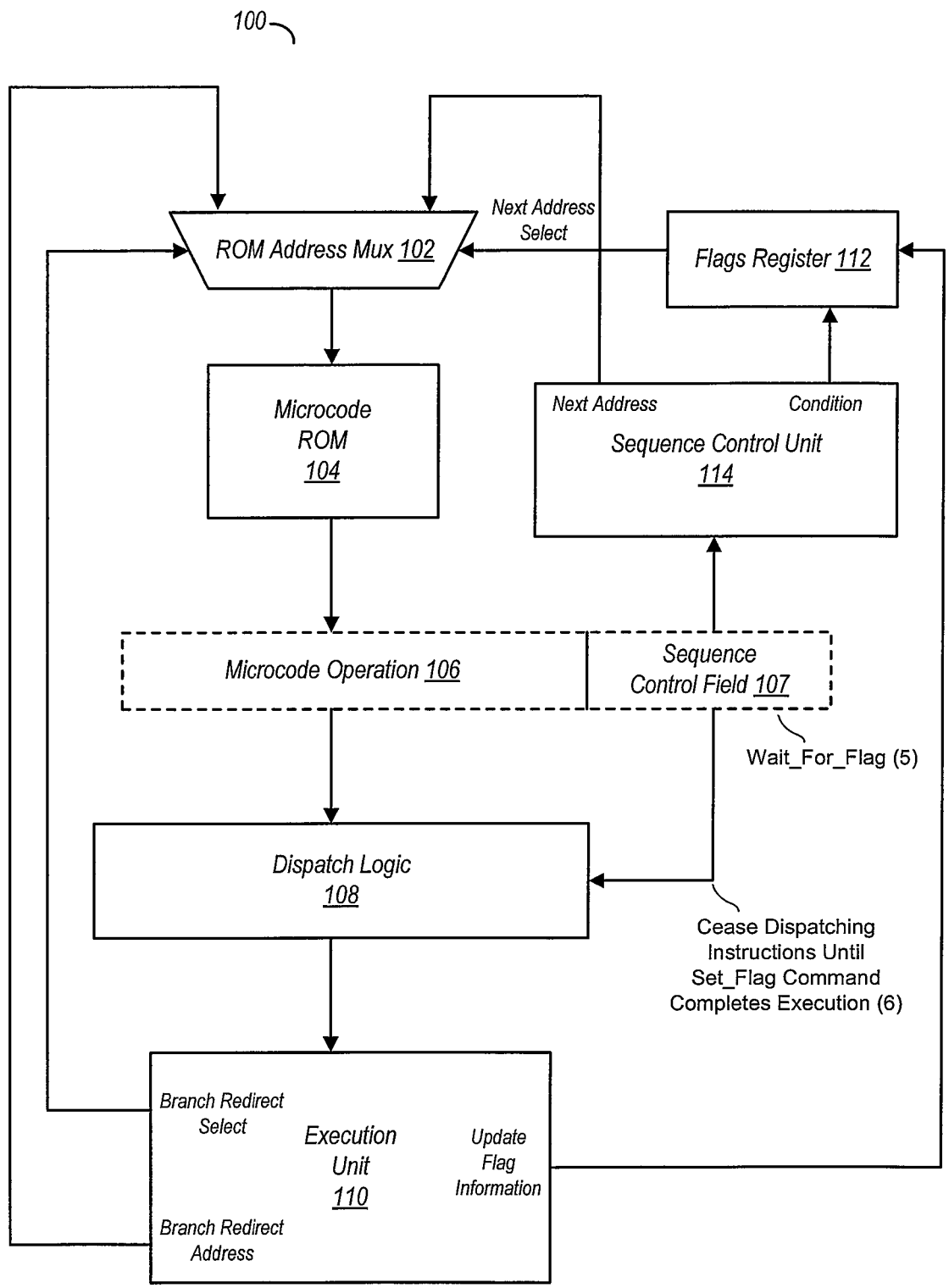
Figure 4C:
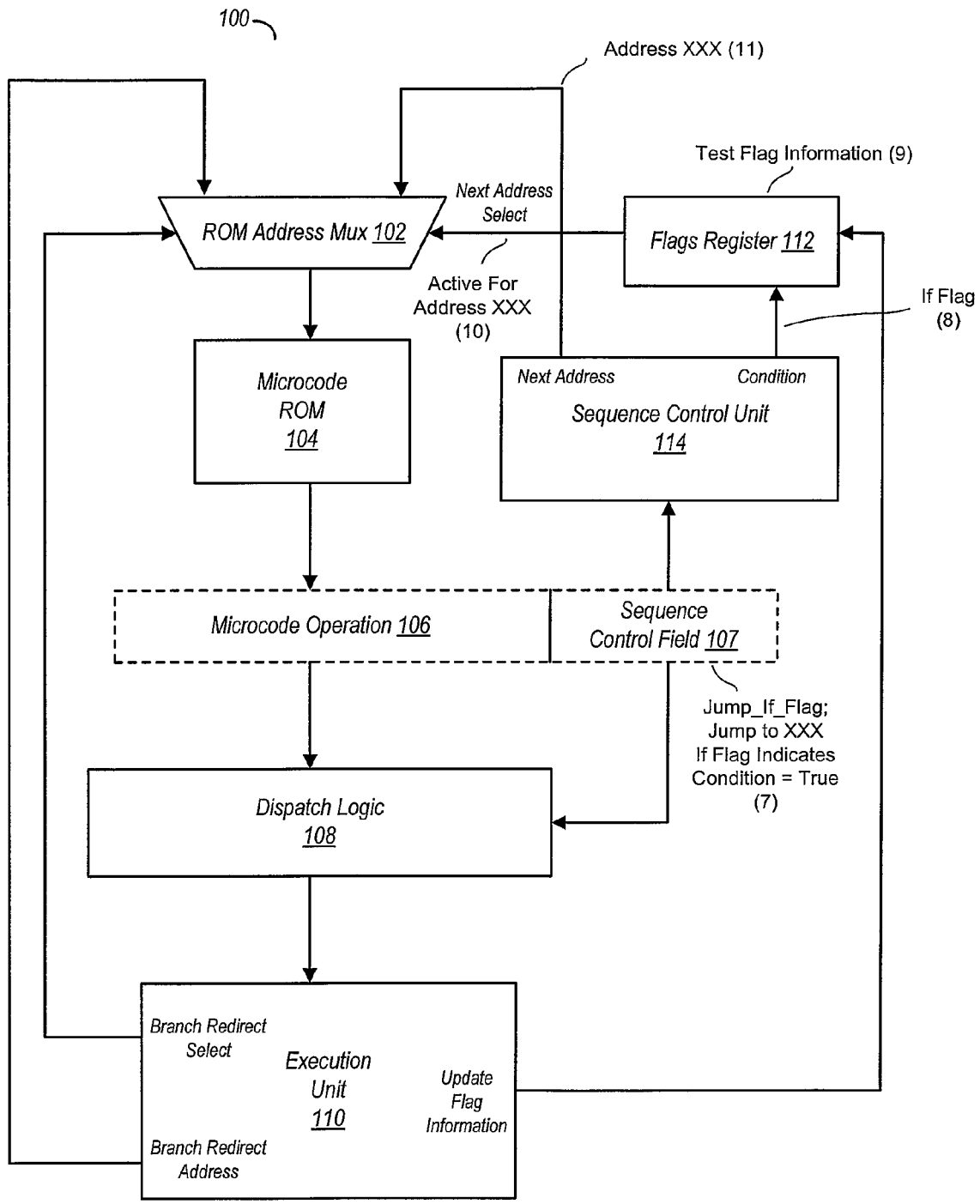

Pipeline Operation Example:

FIGS. 4A-4C illustrate execution of a sequence including the set_flag command, the wait_for_flag command, and the jump_if_flag command for one embodiment of a processor pipeline. More particularly, the use of these commands will be illustrated in conjunction with pipeline 100 as originally illustrated in FIG. 2. However, it should be noted that the aforementioned commands may be utilized in other processor pipelines as well.

Turning now to FIG. 4A, performing early branch determination in pipeline 100 may begin with (0), wherein microcode ROM 104 may receive an indication of an instruction from and instruction cache (e.g., instruction cache 16 of FIG. 1). This may indicate to microcode ROM the issuance of an ISA-level instruction requiring execution of a microcode routine. Subsequent to receiving the indication, microcode ROM 104 may issue the set_flag command (1), which corresponds to microcode operation 106 in this figure. Based on certain data (shown as "ZZZ data" in this example), the set_flag command may determine conditions for at least one branch instruction included in the microcode routine. The conditions indicated by the data may be those conditions upon with the branch may be taken or not taken. Such conditions may include an indication of a mode of operation, a particular value of a register, or any other condition upon which a branch may be taken or not taken. The data indicating the conditions may be provided from a register in a register file, from microcode ROM 104, or any other source wherein such data may be stored.

Dispatch logic 108 may receive the set_flag command, and may in turn dispatch the set_flag command to an available execution unit 110 (2). Upon receiving the set_flag command, execution unit 110 may begin executing the command using the provided data in order to evaluate the conditions indicated therein (3). As shown in the drawing, execution unit 110 is coupled to flags register 112. Accordingly, execution of the set_flag command may cause flag information in flags register 112 to be updated with new flag information (4). It should be noted that if no changes to the flag information are to be made, then the new flag information may be the same as the previously stored flag information. Regardless of whether flag values are changed or not, execution of the set_flag command based on the provided data may cause execution unit 110 to indicate to flags register that one or more flags are to be set to a certain value.

One or more of the flags stored in flag register 110 may indicate whether a branch is or is not to be taken when a corresponding branch instruction is executed. Additional flags may be used to indicate other information, such as a number of times a branch is to be taken (e.g., for branch instructions executed as part of a loop), specific instances of when a branch is to be taken or not taken (e.g., for a branch instruction that may be executed multiple times wherein the branch is sometimes taken and sometimes not taken), and so forth. Flags register 112 may also store flags indicating other actions that may be performed in conjunction with the execution of certain instructions (including branch instructions), such as incrementing of a value stored in a register, decrementing a value stored in a register, and shifting a register.

FIG. 4B illustrates the use of the wait_for_flag command for one embodiment. In this example, the wait_for_flag command is provided in sequence control field 107 (5), instead of as a microcode operation 106, as was the set_flag command. The sequence control field 107 may be provided to and executed by sequence control unit 114. The wait_for_flag command, when executed, may cause dispatch logic 108 to cease dispatching instructions until the set_flag command has completed execution (6). This may enable all flags to be updated or otherwise set to their required states prior to allowing the execution of any branch instruction dependent thereon. It should be noted that while the wait_for_flag command may cause dispatch logic 108 to cease dispatching instructions until the set_flag command completes execution, it may not be required for the set_flag command to be fully retired before resuming the dispatching of instructions.

As shown in the drawing, sequence control field 107 is associated with a microcode operation 106. In some instances, the wait_for_flag command may be provided in sequence control field 107 in conjunction with a set_flag command provided in a microcode operation 106. However, in other instances, the wait_for_flag command may be provided in a sequence control field 107 with an instruction contained in another microcode operation 106. This may enable additional unrelated instructions to be executed in processor embodiments that support the concurrent execution of multiple instructions. This in turn may reduce the amount of time that pipeline 100 may stall while the wait_for_flag command is active.

FIG. 4C illustrates the operation of a branch instruction in conjunction with a jump_if_flag command. When microcode ROM 104 issues a branch instruction in a microcode operation 106, the corresponding sequence control field 107 may include a jump_if_flag command. Similar to the wait_for_flag command, the jump_if_flag command may be executed by sequence control unit 114. In the example shown, execution of the jump_if_flag command may determine that a microcode routine is to perform a jump (i.e. branch taken) if a certain condition is true (7). More particularly, in this example, execution of the jump_if_flag indicates that address XXX is the address of the next instruction if the condition is true. The execution of the jump_if_flag command may be performed when sequence control unit 114 indicates to flags register 112 the flag information that is to be tested (8). The flag information may then be tested (9) to determine whether the branch is taken or not taken. Since the next address is address XXX when the branch is to be taken in this example, when the test indicates that the condition is true, flags register 112 may assert the next address select signal (10), while sequence control unit 114 provides address XXX to ROM address multiplexer 102 (11). Thus, even when the branch is taken in this particular example, there is no need for execution unit 110 to assert the branch redirect select line or to provide a branch redirect address to ROM address multiplexer 102. This in turn may prevent the pipeline from being cleared responsive to a branch being taken, thereby avoiding a potential performance penalty.

If the testing of the flag information indicates that a branch is not to be taken, sequence control unit 114 may queue the address of the next instruction in the sequence (i.e. the address of the instruction in the even the branch is not taken). Subsequently, sequence control unit 114 may retest the flag for the opposite condition or cause another action to be performed to cause the next address select line to be asserted, whereby the next address in the sequence may then be provided to ROM address multiplexer 102.

Figure 5:
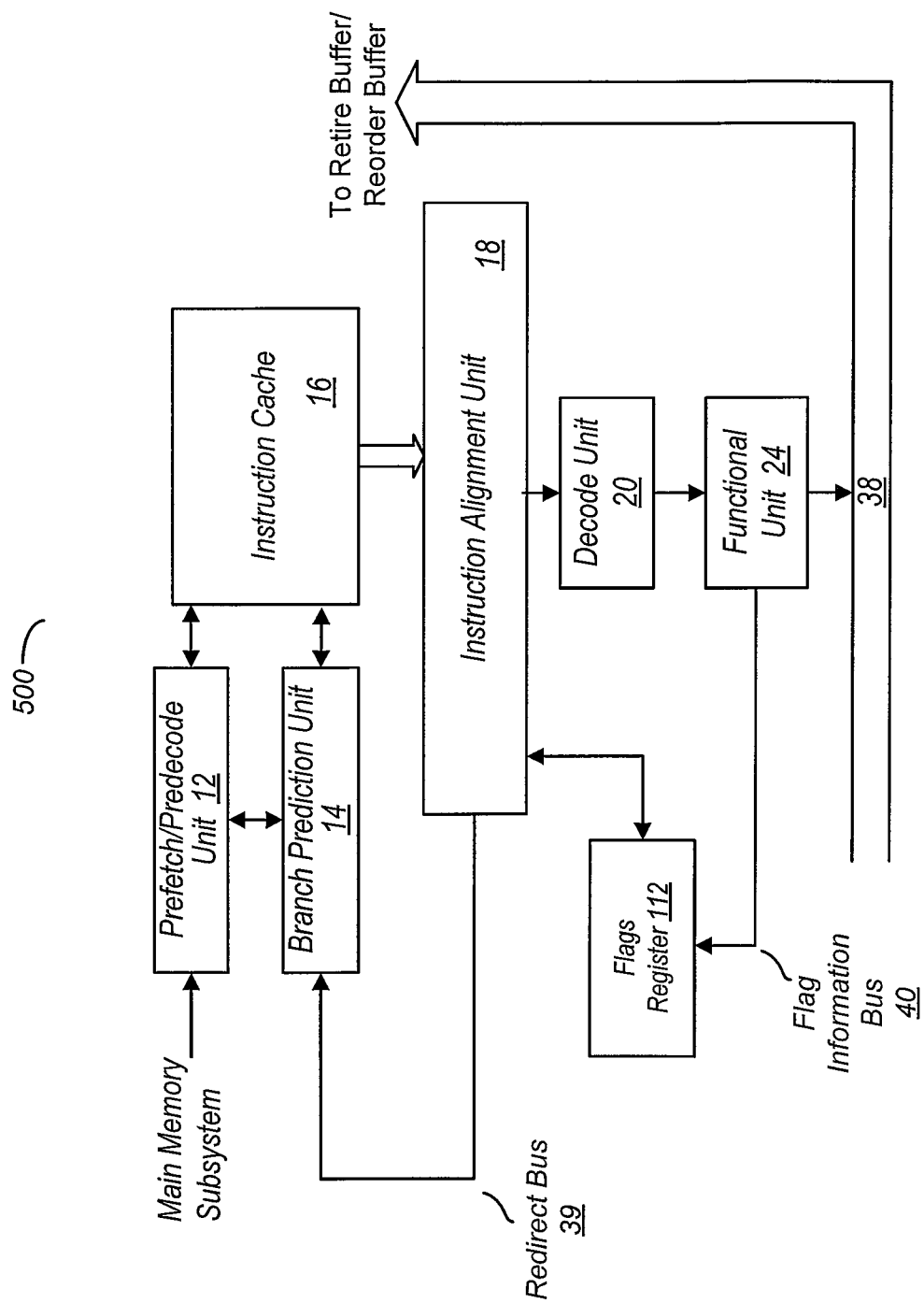
FIG. 5 is a block diagram of one embodiment of a processor pipeline configured to perform branch determination at an instruction set architecture (ISA) level.

Early Branch Determination for ISA-Level Instructions:

While the embodiments described above have been explained in the contest of a pipeline configured to execute microcode instructions, embodiments are possible and contemplated wherein early branch determination may be performed for ISA-level branch instructions. FIG. 5 is a block diagram of an exemplary embodiment of a pipeline wherein early branch determination of ISA-level branch instructions may be performed.

In the embodiment shown, pipeline 500 includes a prefetch/predecode unit 12, a branch prediction unit 14, an instruction cache 16, instruction alignment unit 18, decode unit 20, functional unit 24, and flags register 112. Functional unit 24 may be coupled to a results bus 38, which may in turn be coupled to a retire buffer and/or a reorder buffer (not shown here). In addition, instruction alignment unit 18 may be coupled to branch prediction unit 14 by a redirect bus 39, which may convey information regarding branches whose paths have been determined. Functional unit 24 may also be coupled to flags register 112 by a flag information bus 40, which may be used to convey flag information. In embodiments having multiple functional units 24, each functional unit may be coupled to flags register 112 by flag information bus 40. As an alternative, some embodiments having multiple functional units 24 may include multiple, dedicated instances of flags register 112 and flag information bus 40 for each functional unit 24.

In the embodiment shown, processor pipeline 500 may be configured to execute an ISA level set_flag command and an ISA-level jump_on_flag command, which operate similar to those described above. In some embodiments, an ISA-level wait_for_flag command may also be implemented, while in other embodiments an operation similar to the wait_for_flag command may be implicitly defined as part of the jump_on_flag command.

In the embodiment shown, prefetch/predecode unit 12 may be coupled to receive instructions from a main memory subsystem (not shown), and may detect the presence of branch instructions from among the received instructions. In some embodiments, instructions may be received as part of a group of instructions that are to be executed as a routine. Such a group of instructions may include a set_flag command, which may be used to indicate the presence of one or more branch instructions in the routine. Upon detection of one or more branch instructions, prefetch/predecode unit 12 may provide notifications to instruction cache 16 and branch prediction unit 14.

Software executing in a processor including pipeline 500 may dispatch the ISA-level set_flag command to functional unit 24, wherein it may be executed and one or more flags in flag register 112 may be set responsive thereto. In one embodiment, the ISA-level set_flag command may be inserted into an instruction stream that includes branch instructions at compile time. The ISA-level set_flag command may be inserted in such a position within the instruction stream such that it is issued and executed prior to any jump instructions for which it may evaluate certain conditions.

As noted above a wait_for_flag command may be defined as an ISA-level instruction, or may be implicitly defined as a part of the jump_if_flag command. In either case, the wait_for_flag command may be used ensure that a previously issued set_flag command has completed execution prior to execution of a branch instruction in conjunction with the jump_if_flag command.

Branch instructions to be executed in the embodiment shown may include a field similar to sequence control field 107 discussed above. The sequence control field may include a jump_if_flag command, and may additionally include an implicit wait_for_flag command. When a branch instruction is provided to instruction alignment unit 18, the jump_if_flag command in the corresponding sequence control field may cause the instruction alignment unit to query flags register 112. The querying of flags register 112 may test the condition upon with the branch is to be taken or not taken, wherein the state of which may be determined by the prior execution of the set_flag instruction. Responsive to the query, flags register 112 may respond by providing to instruction alignment unit information indicating whether or not the branch is to be taken or not taken. Instruction alignment unit 18 may then provide the determined branch information over redirect bus 39, to branch prediction unit 14. Based on this information, branch prediction unit 14 may effectively "predict" the correct path of the branch instruction. Since the direction of the branch was predetermined in response to execution of the set_flag command, the "prediction" by branch prediction unit is guaranteed to be correct.

Subsequent to providing the determined branch information to branch prediction unit 14, the branch instruction may be provided to decode unit 20, where it may be decoded and dispatched to functional unit 24. Functional unit 24 may execute the branch instruction. Since branch prediction unit 14 was previously provided with information causing it to correctly predict the branch, instruction execution, instructions issued subsequent to the branch instruction may be executed without speculation. This may in turn improve processor performance, since the guaranteed correct prediction of branch instructions may eliminate the need to stall the pipeline in response to a branch misprediction and the speculative execution of instructions based thereon.

It should be noted that the embodiment described herein is but one possibility of a processor pipeline wherein early branch determination may be performed using ISA-level instructions. Broadly speaking, various embodiments of early branch determination for ISA-level branch instructions may be performed on any processor wherein an ISA-level equivalent of a set_flag command and an ISA-level equivalent of a jump_if_flag are included in the instruction set. An ISA-level wait_for_flag command may also be defined in the instruction set, or alternatively, may be implicitly defined in conjunction with the jump_if_flag command, as previously described.

Computer System

Figure 6:
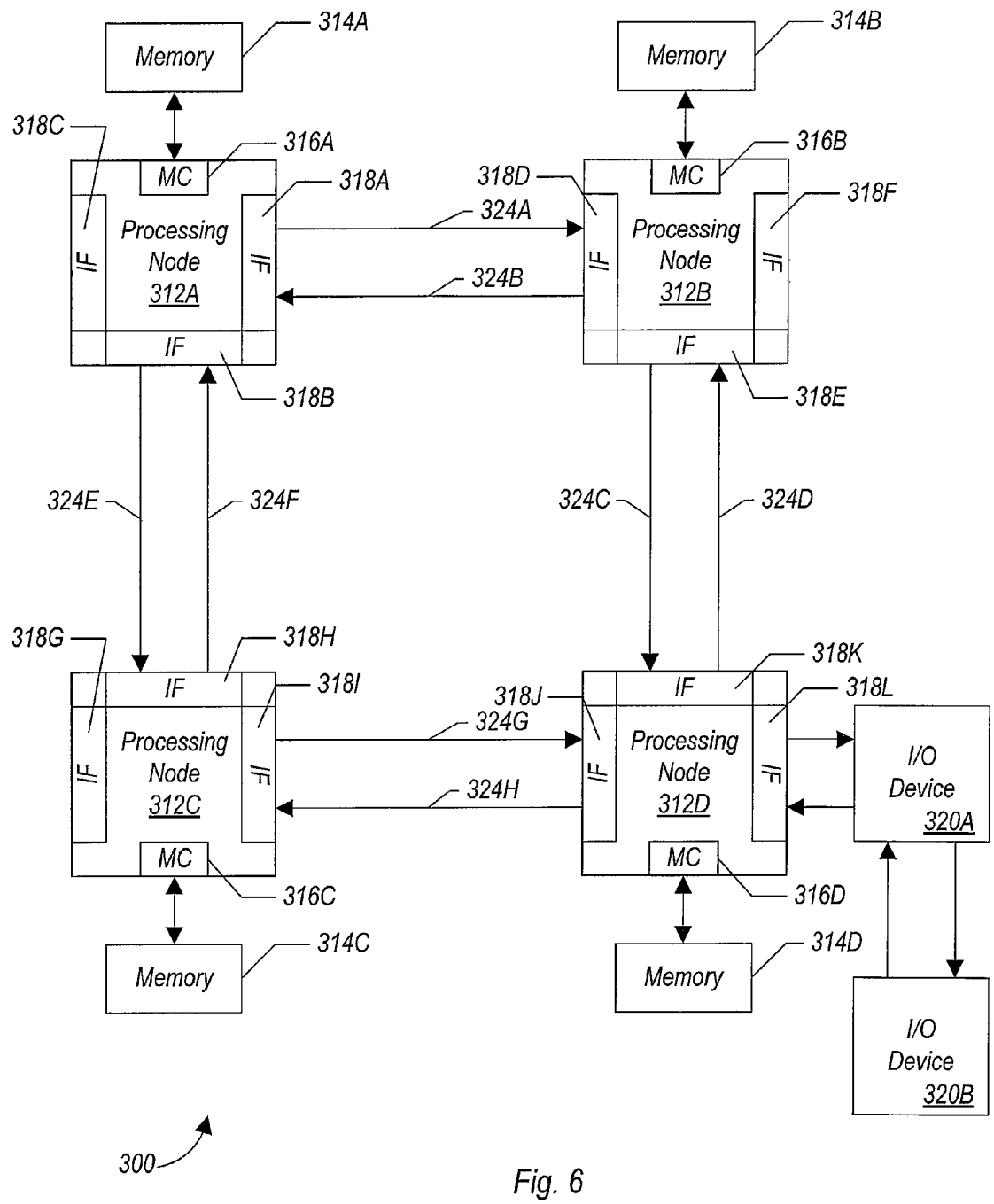
FIG. 6 is a block diagram of one embodiment of a computer system.

Turning now to FIG. 6, an embodiment of a computer system 300 is shown. In the embodiment of FIG. 6, computer system 300 includes several processing nodes 312A, 312B, 312C, and 312D. Each processing node is coupled to a respective memory 314A-314D via a memory controller 316A-316D included within each respective processing node 312A-312D. Additionally, processing nodes 312A-312D include interface logic used to communicate between the processing nodes 312A-312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A-320B in a daisy chain configuration) via interface logic 318L. Other processing nodes may communicate with other I/O devices in a similar fashion.

Processing nodes 312A-312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C-324H are used to transmit packets between other processing nodes as illustrated in FIG. 6. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the Peripheral Component Interconnect (PCI) bus or Industry Standard Architecture (ISA) bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 6. Any suitable routing algorithm may be used. Other embodiments of computer system 300 may include more or fewer processing nodes then the embodiment shown in FIG. 6.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A-312D, in addition to a memory controller and interface logic, may include one or more processors. Broadly speaking, a processing node comprises at least one processor and may optionally include a memory controller for communicating with a memory and other logic as desired. More particularly, each processing node 312A-312D may comprise one or more copies of processor 10 as shown in FIG. 1 (e.g. including various structural and operational details shown in FIGS. 2-5). One or more processors may comprise a chip multiprocessing (CMP) or chip multithreaded (CMT) integrated circuit in the processing node or forming the processing node, or the processing node may have any other desired internal structure.

Memories 314A-314D may comprise any suitable memory devices. For example, a memory 314A-314D may comprise one or more RAMBUS DRAMs (RDRAMs), synchronous DRAMs (SDRAMs), DDR SDRAM, static RAM, etc. The address space of computer system 300 is divided among memories 314A-314D. Each processing node 312A-312D may include a memory map used to determine which addresses are mapped to which memories 314A-314D, and hence to which processing node 312A-312D a memory request for a particular address should be routed. In one embodiment, the coherency point for an address within computer system 300 is the memory controller 316A-316D coupled to the memory storing bytes corresponding to the address. In other words, the memory controller 316A-316D is responsible for ensuring that each memory access to the corresponding memory 314A-314D occurs in a cache coherent fashion. Memory controllers 316A-316D may comprise control circuitry for interfacing to memories 314A-314D. Additionally, memory controllers 316A-316D may include request queues for queuing memory requests.

Generally, interface logic 318A-318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A-320B may be any suitable I/O devices. For example, I/O devices 320A-320B may include devices for communicating with another computer system to which the devices may be coupled (e.g. network interface cards or modems). Furthermore, I/O devices 320A-320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. Furthermore, any I/O device implemented as a card may also be implemented as circuitry on the main circuit board of the system 300 and/or software executed on a processing node. It is noted that the term "I/O device" and the term "peripheral device" are intended to be synonymous herein.

Furthermore, one or more processors 10 may be implemented in a more traditional personal computer (PC) structure including one or more interfaces of the processors to a bridge to one or more I/O interconnects and/or memory.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method comprising
a first command issuing within a computer processor, wherein execution of the first command by the computer processor includes evaluating one or more conditions to set one or more flags stored in a storage element of the computer processor;
subsequent to the first command issuing, a second command issuing within the computer processor, wherein execution of the second command by the computer processor includes causing the computer processor to wait until the one or more flags are set; and
subsequent to the first and second commands issuing, a third command issuing within the computer processor, wherein execution of the third command by the computer processor includes performing a jump operation if at least one of the one or more flags set by the first command indicate that a jump condition is true, wherein performing the jump operation includes the storage element asserting a select signal directly to an address multiplexer to select an address of next command to be executed based on the storage element determining that the jump condition is true.

2. The method of claim 1, wherein execution of the second command includes causing a dispatch unit within the computer processor to stop dispatching commands until execution of the first command sets the one or more flags.

3. The method of claim 1, further comprising issuing one or more commands within the computer processor after issuing the first command and before issuing the second command, wherein the one or more commands are not related to the first and second commands.

4. The method of claim 1, wherein execution of the third command by the computer processor further includes performing at least one additional operation.

5. The method of claim 1, wherein the first, second, and third commands are microcode commands.

6. The method of claim 1, wherein the jump operation has a target that is known when the third command is dispatched at a first dispatch cycle, and wherein the method comprises dispatching the target of the jump operation in a second dispatch cycle that immediately follows the first dispatch cycle.

7. An apparatus, comprising:
a storage element configured to store one or more flag values;
a microcode execution unit configured to execute a sequence of microcode commands that causes one or more conditions to be evaluated to set the one or more flag values and at least a portion of the microcode execution unit to stall until the one or more flags are set; and
an address multiplexer coupled to receive a first select signal and a second select signal, wherein the address multiplexer is configured to receive the first select signal directly from the storage element responsive to the storage element determining that a jump condition is true based on at least one of the one or more flag values, and wherein the microcode execution unit is configured to assert the second select signal directly to the address multiplexer responsive to execution of a microcode command indicating a branch is to be taken when the branch was not predicted or determined prior to execution of the microcode command.

8. The apparatus of claim 7, wherein execution of the sequence of microcode commands causes a jump operation based on at least one of the one or more flag values to be performed at a time at which the one or more flag values have been set by a prior command within the sequence of microcode commands.

9. The apparatus of claim 8, wherein the apparatus includes processor that includes the storage element and the microcode execution unit.

10. The apparatus of claim 8, wherein the execution of the sequence of microcode commands causes at least one additional operation to be performed in conjunction with the jump, wherein the at least one additional operation includes one or more of the following: incrementing a register, decrementing a register, shifting a register, logically inverting one or more data bits.

11. An apparatus, comprising:
a storage element configured to store one or more flag values; and
an execution pipeline, wherein the execution pipeline includes a dispatch unit and an execute unit;
wherein the execution pipeline is configured to execute a first command that causes the execute unit to evaluate one or more conditions to set the one or more flag values;
wherein the execution pipeline is configured to execute a second command that causes the dispatch unit to cease dispatching instructions to a subsequent unit in the execution pipeline until the one or more flag values are set; and
wherein the execution pipeline is configured to execute a third command issued after the second command, wherein the third command causes a jump operation to be performed based on at least one of the one or more flag values indicating that a jump condition is true;
wherein the execution pipeline further includes an address multiplexer coupled to receive a first select signal directly from the execute unit and a second select signal directly from the storage element, wherein the execute unit is configured to assert the first select signal responsive to determining a branch during execution of a branch instruction, and wherein the storage element is configured to assert the second select signal responsive to determining that the jump condition is true.

12. The apparatus of claim 11, wherein the second command causes the dispatch unit to recommence dispatching instructions to the subsequent unit in the instruction pipeline upon the second command completing and prior to the second command being retired.

13. The apparatus of claim 11, wherein the first, second, and third commands are microcode commands.

14. The apparatus of claim 13, further comprising:
a microcode memory storing microcode commands, including a sequence of microcode commands in which the second command is after the first command and third command is after the second command.

15. The apparatus of claim 14, wherein an output of the address multiplexer is coupled to the microcode memory, wherein the microcode memory is configured to access a microcode command at an address provided by the address multiplexer.

16. The apparatus of claim 11, wherein each of the first, second, and third commands are instructions of an instruction set architecture (ISA) of a processor.

17. The apparatus of claim 11, wherein storage element is configured to store at least one flag value indicating whether or not a jump operation is to be performed responsive to execution of the third command, and wherein the storage element is further configured to store additional flags indicating additional operations performed responsive to execution of the third command, wherein the additional operations include one or more of the following: incrementing a register, decrementing a register, shifting a register.

18. The apparatus of claim 11, wherein the apparatus is configured to execute one or more commands subsequent to issuance of the first command and prior to issuance of the second command, wherein the one or more command are unrelated to the first and second commands.

19. The apparatus of claim 11, wherein the apparatus includes a computer processor that includes the storage element and the execution pipeline.

20. The apparatus of claim 11, further comprising a sequence control unit, wherein the address multiplexer is configured to select an address provided by the execute unit when the first select signal is asserted, and wherein the address multiplexer is configured to select an address provided by the sequence control unit when the second select signal is asserted.

* * * * *